United States Patent
Liu et al.

(10) Patent No.: US 9,114,332 B1
(45) Date of Patent: Aug. 25, 2015

(54) MULTIPHASE FLOW MEASUREMENT APPARATUS UTILIZING PHASE SEPARATION

(71) Applicants: Herbert Liu, Bakersfield, CA (US); Ke-Tien Liu, Bakersfield, CA (US)

(72) Inventors: Herbert Liu, Bakersfield, CA (US); Ke-Tien Liu, Bakersfield, CA (US)

( * ) Notice: Subject to any disclaimer, the term of this patent is extended or adjusted under 35 U.S.C. 154(b) by 85 days.

(21) Appl. No.: 13/841,117

(22) Filed: Mar. 15, 2013

Related U.S. Application Data

(60) Provisional application No. 61/674,487, filed on Jul. 23, 2012.

(51) Int. Cl.
 *G01F 15/08* (2006.01)
 *G01F 1/74* (2006.01)
 *B01D 19/00* (2006.01)

(52) U.S. Cl.
 CPC .................................. *B01D 19/0063* (2013.01)

(58) Field of Classification Search
 None
 See application file for complete search history.

(56) References Cited

U.S. PATENT DOCUMENTS

| | | |
|---|---|---|
| 2,882,995 A | 4/1959 | Smith |
| 4,429,581 A | 2/1984 | Furmaga |
| 4,596,136 A | 6/1986 | Zacharias |
| 4,688,418 A | 8/1987 | Cheung et al. |
| 4,760,742 A | 8/1988 | Hatton |
| 4,773,257 A | 9/1988 | Aslesen et al. |
| 4,852,395 A | 8/1989 | Kolpak |
| 4,881,412 A | 11/1989 | Northedge |
| 4,939,817 A | 7/1990 | Weber |
| 4,951,700 A | 8/1990 | Kalman |
| 5,099,697 A | 3/1992 | Agar |
| 5,132,011 A | 7/1992 | Ferris |
| 5,195,380 A | 3/1993 | Hatton et al. |
| 5,211,842 A | 5/1993 | Tuss et al. |
| 5,390,547 A | 2/1995 | Liu |
| 5,526,684 A | 6/1996 | Liu et al. |
| 5,741,977 A | 4/1998 | Agar et al. |
| 6,032,539 A | 3/2000 | Liu et al. |
| 6,234,030 B1 | 5/2001 | Butler |
| 7,311,001 B2 | 12/2007 | Liu et al. |
| 2007/0186770 A1 | 8/2007 | Heath et al. |

*Primary Examiner* — Harshad R Patel
(74) *Attorney, Agent, or Firm* — James M. Duncan, Esq.; Klein DeNatale Goldner

(57) ABSTRACT

An apparatus for separating and measuring fluid streams having oil, water, and gas phases includes a first generally vertical fluid separation chamber, a second generally vertical fluid separation chamber, an oil outlet line, a water outlet line, and a gas outlet line. The first separation chamber includes a first outlet at the top end for the gas outlet line. A second outlet is at the bottom end of the first fluid separation chamber for discharging the oil and water phases. The second separation chamber includes an inlet for receiving the oil phase and the water phase from the first chamber. The oil outlet line directs the oil phase away from the second chamber. The water outlet line directs the water phase away from the second chamber. The gas outlet line directs the gas away from the first chamber. Flow meters measure water, gas, and oil flow.

3 Claims, 3 Drawing Sheets

MULTIPHASE FLOW MEASUREMENT APPARATUS UTILIZING PHASE SEPARATION

RELATED APPLICATIONS

This Application claims priority of U.S. Provisional Patent Application No. 61/674,487, entitled "Multiphase Flow Measurement Apparatus and Method" and filed Jul. 23, 2012, which is incorporated herein by reference in its entirety.

BACKGROUND OF THE INVENTION

1. Field of the Invention

The present invention generally relates to devices and methods for flow measurement. In particular, a method for continuous multiphase flow measurement is disclosed, as well as the apparatus utilized in the method. In this invention, phase separation and measurement are accomplished utilizing a compact piping arrangement as compared to the measurement vessels utilized in conventional measurement systems.

2. Background

U.S. Pat. No. 5,390,547 (Liu) teaches a multiphase flow measurement method and apparatus using a piping arrangement. U.S. Pat. No. 6,032,539 (Liu et al.) teaches a method and apparatus to automatically calibrate a water cut measurement device to improve the measurement accuracy. These inventions use a two phase measurement technique, in that the incoming multiphase flow stream (i.e., natural gas, crude oil, and produced water) are separated into two separate streams, namely a gas phase and a liquid phase. The gas phase predominantly comprises natural gas. The liquid phase predominantly comprises a mixture of crude oil and produced water. In these devices, no further separation of the liquid phase occurs. Instead, a "water cut meter" is used to determine the water content in the liquid stream. The respective volumes of net oil and produced water are ascertained by applying the water cut measurement to the total liquid flow rate.

However, as the water cut in the liquid stream increases, the net oil measurement loses accuracy because the net oil measurement resolution sharply decreases when the water cut of the production stream increases. An increase in water cut is common for mature, depleting water drive hydrocarbon reservoirs.

U.S. Pat. No. 7,311,001 (also by Liu) provides for separation of the liquid phase components, but this device utilizes a horizontal section having two vertical chambers, where a weir plate divides the first vertical chamber from the second vertical chamber.

SUMMARY OF THE INVENTION

The presently disclosed apparatus utilizes generally vertical pipe segments rather than pressure vessels to separate the fluid components into a gas flow stream, a water flow stream and an oil flow stream. The utilization of generally vertical pipe segments facilitates the fabrication of a compact measurement unit which is relatively easy to transport, does not require expensive pressure vessels, and which presents a relatively small footprint which is often required for transport, or for placement within a crowded tank farm or production deck of a platform.

Separation of the multiphase flow stream into single-phase flow streams provides a desirable environment for accurate measurement of oil, water and gas production rates. The apparatus may be configured as a skid package to facilitate transportation and installation of the unit. Because the oil stream may continue to contain a small amount of water, a conventional water cut meter may be employed to determine the water content in the oil stream.

In one aspect of the invention, the present apparatus includes a first generally vertical fluid separator pipe having a top end and a bottom end. The first separator pipe includes an inlet member connected to the fluid separator pipe between the top end and the bottom end. The first fluid separator pipe also includes a first outlet at the top end, generally for discharge of the gas phase, and a second outlet at the bottom end, generally for discharge of the oil and water phases. A first conduit is connected to the first outlet and includes a back-pressure control means and a gas flow measurement means. A second generally vertical separator pipe is also provided, the second vertical separator pipe having a first inlet connected to the first outlet of the first vertical separator pipe, and a second inlet connected to the second outlet of the first vertical separator pipe. An upper interface detection device is provided for detecting the interface between the oil phase and the water phase at a first elevation within the second vertical separator pipe. A lower interface detection device is provided for detecting the interface between the oil phase and the water phase at a second elevation within the second vertical separator pipe. The first elevation is relatively higher than the second elevation. A first actuated valve is closed when the interface between the oil phase and the water phase is detected at or above the first elevation and open when the interface is detected at or below the second elevation. A second actuated valve is open when the interface between the oil phase and the water phase is detected at or above the first elevation and closed when the interface is detected at or below the second elevation. An oil outlet line is connected to the first actuated valve, and a water outlet line is connected to the second actuated valve. A liquid flow meter is provided, capable of determining the liquid flow rate from either the oil outlet line or the water outlet line. A processing means is operationally connected to the upper interface detection device and the lower interface detection device, as well as to the first actuated valve and the second actuated valve. The processing means is configured to operate the first and second actuated valves such that the level of interface between the oil phase and the water phase is maintained between the first elevation and the second elevation.

In another aspect of the invention, the second vertical separator pipe includes a vertical partition plate disposed therein. The vertical partition plate is disposed so as to prevent fluid flowing into the second separator pipe via the second inlet from flowing directly into the oil outlet line.

In another aspect of the invention, the inlet member connected to the first vertical fluid pipe separator is oriented so as to allow fluid to enter the first vertical fluid separator pipe at a downward angle. This creates a cyclonic flow pattern within the first vertical fluid separator pipe.

Another aspect of the invention provides an apparatus for separating and measuring fluid streams comprising an oil phase, a water phase, and a gas phase, wherein the apparatus includes a first generally vertical fluid separation chamber, a second generally vertical fluid separation chamber, an oil outlet line, a water outlet line, and a gas outlet line. The first vertical fluid separation chamber has a top end and a bottom end and includes a first outlet at the top end for discharging the gas phase to the gas outlet line. A second outlet is at the bottom end of the first fluid separation chamber for discharging the oil and water phases. The second vertical fluid separation chamber includes an inlet in fluid communication with the bottom end of the first fluid separation chamber for receiving the oil phase and the water phase therefrom. The oil outlet line directs flow of the oil phase away from the second vertical fluid separation chamber. The water outlet line directs the flow of the water phase away from the second vertical fluid separation chamber. The gas outlet line directs the flow of gas away from the first vertical fluid separation chamber. Flow meters in fluid communication with the gas outlet line, water outlet line, and oil outlet line measure the flow of fluid therethrough.

DETAILED DESCRIPTION OF THE INVENTION

The present device includes, generally, two separation chambers—a first for separating the gas phase from the liquid phase and a second for separating the liquid phase into an oil phase and a water phase. These separation chambers may be formed within a single pipe or may be established across multiple pipe segments, as discussed in greater detail with respect to the various embodiments of the present invention described below.

Figure 1:
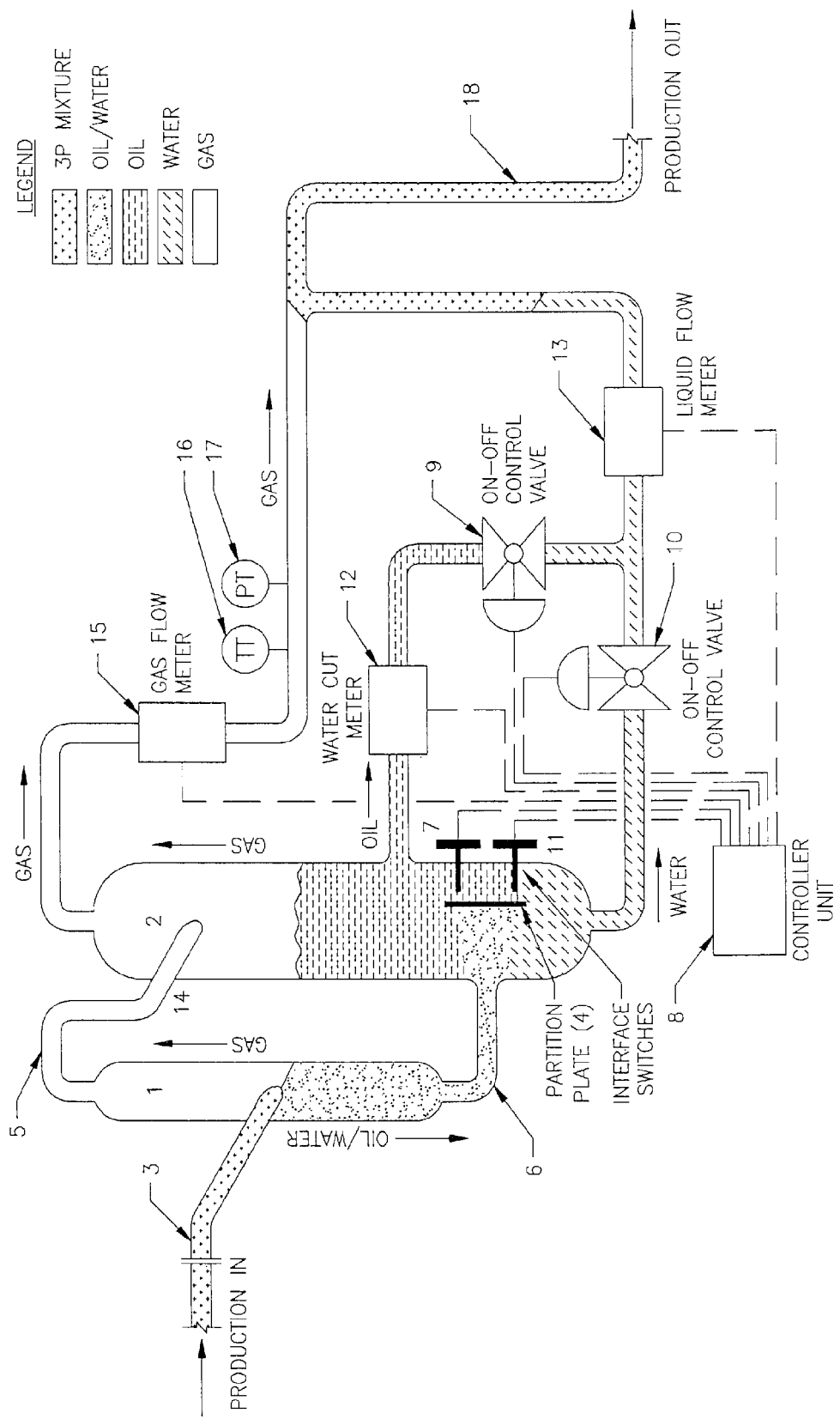
FIG. 1 shows a general schematic flow diagram of one embodiment of an apparatus of the present invention.

FIG. 1 depicts a general schematic flow diagram of one embodiment of the present invention. The separation chambers are composed of two vertical separator pipes. The main purpose of the first separator pipe 1 is to separate a majority of the gas from the liquid (oil and water), and the purpose of the second separator pipe 2 is to further separate the liquid stream into a water stream and an oil stream. After separation, various measurement instruments are used to measure the flow rate and the quality of each stream.

Production fluid from a production well flow line or a comingled production flow line 3 is introduced to the first separator pipe 1. The inlet pipe enters the side of the first separator pipe preferably at a downward angle and tangential to the outer wall of the first separator pipe. The objective of tangential downward entry is to create a cyclonic action of the flow pattern in the first separator pipe to promote separation of gas and liquid.

The separated gas stream moves upward in the upper section of the first separator pipe and leaves the first separator pipe through the gas outlet pipe 5 at the top. The separated liquid stream containing oil and water moves downward in the lower section of the first separator pipe and leaves the first separator pipe through a liquid outlet pipe 6 at the bottom.

The liquid stream from the first separator pipe enters the side of the lower section of second separator pipe 2 as shown. The second separator pipe 2 is utilized to separate the liquid stream into an oil stream and a water stream. As the liquid stream enters this separator pipe, oil moves upward and water moves downward due to density difference between oil and water. Two oil-water interface detection switches are installed at different elevations of the second separator pipe. As the oil-water interface reaches the upper interface detector switch 7, a process controller unit 8 automatically closes the on-off control valve 9 in the oil outlet pipe and opens the on-off control valve 10 in the water outflow pipe to allow only the water to flow out of the second separator pipe. This causes more oil to continuously accumulate in the separator pipe and consequently the oil-water interface continuously moves gradually downward below the upper oil-water interface detector switch 7. As the oil-water interface reaches the lower oil-water interface detector switch 11, the process controller unit 8 closes the on-off control valve 10 in the water outlet pipe and open the on-off control valve 9 in the oil outflow pipe, to allow only the oil to flow out of the second separator pipe. This causes more water to continuously accumulate in the second separator pipe and the oil-water interface to move upward above the lower oil-water detector switch 11. As the oil-water interface reaches the upper oil-water interface detector switch 7, the process controller unit 8 closes the on-off control valve 9 in the oil outlet pipe and open the on-off control valve 10 in the water outlet pipe 10 to allow only the water to flow out of the second separator pipe. The process repeats as the production fluid continue to flow into the system.

To prevent the incoming liquid from flowing directly to the oil outlet port, a vertical partition plate 4 is placed in the lower section of the second separator pipe as shown. This partition plate 4 can be placed at any location in the second separator pipe, but preferably at the center of the second separator pipe or between the center line and the oil outlet port.

The oil outlet stream from the second separator pipe may still contain a small amount of water. A water cut measurement instrument 12, such as those based on capacitance or microwave technique, is installed in the oil outlet pipeline to measure water content in this stream. Downstream of the oil on-off control valve 9 and water on-off control valve 10, a liquid flow meter 13 (such as coriolis meter, turbine meter, vortex meter, positive displacement or other types of liquid flow meter) is used to measure the flow rate of either the oil stream or the water stream. Combining the liquid flow rate and water cut measurements, the process controller unit records and process various measurement signals.

The gas outlet stream from the first separator pipe is introduced to the upper section of the second separator pipe through the inlet port 14. In some instances, the separated gas from the first separator pipe may still contain a small amount of liquid droplets. Introducing the gas stream from the first separator pipe to the upper section of the second separator pipe provides an additional opportunity to separate these liquid droplets.

The gas stream that leaves from the top of the second separator pipe is measured with a conventional gas flow meter 15, such as, for example, an ultrasonic meter, vortex meter, coriolis meter, turbine meter, or other types of meters. A temperature indicating device 16 and a pressure indicating device 17 are installed at appropriate locations in the gas flow line to allow calculation of the measured gas flow rate from actual condition to standard condition.

After measurement, the gas and liquid stream are recombined to a main outflow pipeline 18.

Figure 2:
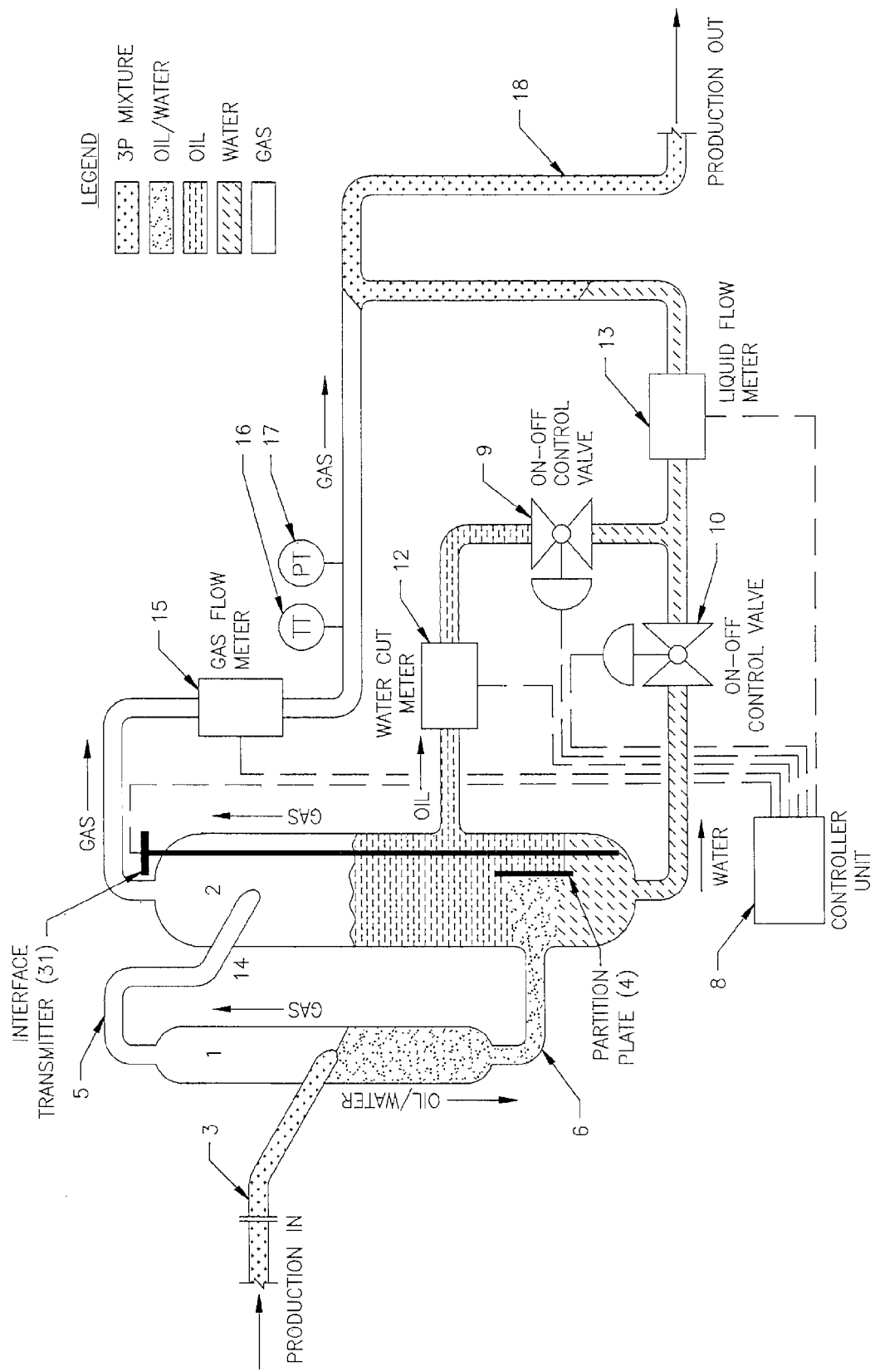
FIG. 2 shows an embodiment of the present apparatus which utilizes a continuous oil/water interface transmitter inserted from the top of the vertical separator pipe.

Various interface control instruments can be used to effect alternative outflow of oil and water phases. One example is to use a continuous oil/water interface transmitter 31 inserted from the top of the vertical separator pipe as shown in FIG. 2.

Figure 3:
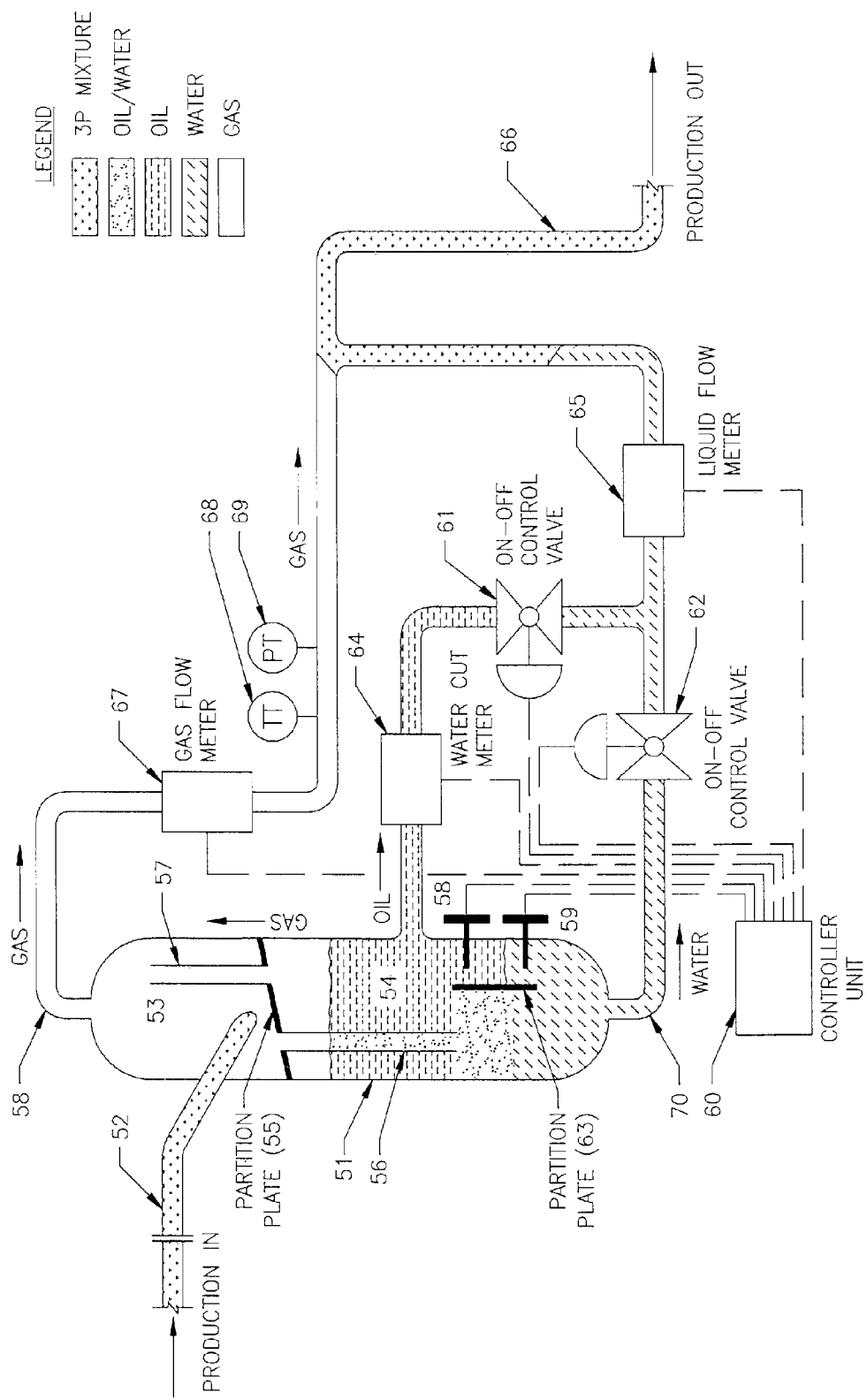
FIG. 3 shows an embodiment of the present apparatus in which a single separator pipe is used to separate the multiphase production fluid into three single phase streams.

Another embodiment of the present invention is shown in FIG. 3. In this embodiment, a single separator pipe 51 includes both separation chambers and is used to separate the multiphase production fluid into three single phase streams, namely, the gas stream, the oil stream and the water stream. Various piping arrangements and instruments are then used for process control and measurement purposes.

Production fluid from a production well flow line or a comingled production flow line 52 is introduced to the upper separation chamber 53 of the separator pipe. The inlet pipe enters the side of the separator pipe, preferably at a downward angle and tangential to the outer wall of the first separator pipe. The objective of tangential downward entry is to create a cyclonic action of the flow pattern in the first separator pipe to promote separation of gas and liquid.

The separator pipe 51 is divided into an upper separation chamber 53 and a lower separation chamber 54 using a partition plate 55. Two small stand-pipes, a liquid down-flow pipe 56 and a gas equalization pipe 57, are placed to the partition plate as shown. Both of these pipes are open on both ends. The partition plate 55 is oriented at an angle to facilitate natural drainage of the collected liquid toward the liquid down-flow pipe 56. The angle of the partition plate 55 can be between 1 to 45 degrees from horizontal, but preferably between 2 to 5 degrees from horizontal. The liquid down-flow pipe provides a mean for the separated liquid in upper separation chamber 53 to flow to lower separation chamber 54. The gas equalization pipe provides a means for the pressure in upper separation chamber 53 and lower separation chamber 54 to equalize.

The separated gas stream moves upward in the upper separation chamber 53 and leaves the separator pipe through the gas outlet pipe 58 at the top. The separated liquid stream containing oil and water moves downward to lower separation chamber 54 through the liquid down-flow pipe 56.

As the liquid stream enters lower separation chamber 54, oil moves upward and water moves downward due to density difference between oil and water. Two oil-water interface detection switches, the upper oil-water interface detector switch 58 and the lower oil-water interface detector switch 59, are installed at different elevations of lower separation chamber 54. As the oil-water interface reaches the upper interface detector switch 58, the process controller unit 60 automatically closes the on-off control valve 61 in the oil outlet pipe and opens the on-off control valve 62 in the water outlet pipe 70 to allow only the water to flow out of lower separation chamber 54. This causes more oil to continuously accumulate in lower separation chamber 54 and consequently the oil-water interface continuously moves gradually downward below the upper oil-water interface detector switch 58. As the oil-water interface reaches the lower oil-water interface detector switch 59, the process controller unit 60 closes the on-off control valve 62 in the water outlet pipe and open the on-off control valve 61 in the oil outflow pipe, to allow only the oil to flow out of the lower separation chamber 54. This causes more water to continuously accumulate in lower separation chamber 54, and the oil-water interface to move upward above the lower oil-water detector switch 59. As the oil-water interface reaches the upper oil-water interface detector switch 58, the process controller unit 60 closes the on-off control valve 61 in the oil outlet pipe and open the on-off control valve 62 in the water outlet pipe to allow only the water to flow out of lower separation chamber 54. The process repeats as the production fluid continue to flow into the system.

To prevent the incoming liquid from flowing directly to the oil outlet port, a vertical partition plate 63 is placed in the lower separation chamber 54. This partition plate can be placed at any location in lower separation chamber 54, but preferably at the center of lower separation chamber 54 or between the center line and the oil outlet port.

The oil outlet stream from the lower separation chamber 54 may still contain a small amount of water. A water cut detection instrument 64, such as those based on capacitance or microwave technique, is installed in the oil outlet pipeline to measure water content in this stream. Downstream of the oil on-off control valve 61 and water on-off control valve 62, a liquid flow meter 65 (such as coriolis meter, turbine meter, vortex meter, positive displacement or other types of liquid flow meter) is used to measure the flow rate of either the oil stream or the water stream. Combining the liquid flow rate and water cut measurements, the process controller unit records and process various measurement signals.

The gas stream that leaves from the top of the upper separation chamber 53 is measured with a conventional gas flow meter 67, such as ultrasonic meter, vortex meter, coriolis meter, turbine meter, or other types. A temperature indicating device 68 and a pressure indicating device 69 are installed at appropriate locations in the gas flow line to allow calculation of the measured gas flow rate from actual condition to standard condition.

After measurement, the gas and liquid stream are recombined to a main outflow pipeline 66.

Returning to the embodiments of the invention shown in FIGS. 1 and 2, the diameter of the first separator pipe 1 depends primarily on the flow rate of the gas component. Its diameter can range from 4" to 60", most typically from 6" to 48". The diameter of the second separator pipe 2 primarily depends on the flow rate and physical properties (viscosity, emulsion type, etc.) of the liquid component (oil and water mixture). Its diameter can range from 6" to 60", but most typically will range from 10" to 48". Any suitable dimensions may be used for the various components of any of the embodiments of the present invention.

While the above is a description of various embodiments of the present invention, further modifications may be employed without departing from the spirit and scope of the present invention. Thus the scope of the invention should not be limited according to these factors, but according to the claims to that follow.

Having thus described the preferred embodiment of the invention, what is claimed as new and desired to be protected by Letters Patent includes the following:

1. An apparatus for separating and measuring fluid streams comprising an oil phase, a water phase, and a gas phase, the apparatus comprising:

a first generally vertical fluid separator pipe having a top end and a bottom end, an inlet member connected to the vertical fluid separator pipe between the top end and the bottom end, the vertical fluid separator pipe further comprising a first outlet at the top end, the first outlet generally for discharge of the gas phase, and a second outlet at the bottom end, the second outlet generally for discharge of the oil phase and water phase;

a first conduit connected to the first outlet;

a second generally vertical separator pipe having a first inlet connected to the first outlet and a second inlet connected to the second outlet, wherein a fluid stream flows freely between the first generally vertical fluid separator pipe and the second generally vertical fluid separator pipe during normal operation of said apparatus;

an upper interface detection device for detecting the interface between the oil phase and the water phase disposed at a first elevation within the second generally vertical separator pipe;

a lower interface detection device for detecting the interface between the oil phase and the water phase disposed at a second elevation within the second generally vertical separator pipe, the first elevation being relatively higher than the second elevation;

a first actuated valve which is closed when the interface between the oil phase and the water phase is detected at or above the first elevation and opened when the interface is detected at or below the second elevation;

a second actuated valve which is opened when the interface between the oil phase and the water phase is detected at or above the first elevation and closed when the interface is detected at or below the second elevation;

an oil outlet line connected to the first actuated valve and in fluid communication with a first outlet of the second vertical separator pipe, and a water outlet line connected to the second actuated valve and in fluid communication with a second outlet of the second vertical separator pipe;

a liquid flow meter capable of determining the liquid flow rate from either the oil outlet line or the water outlet line; and processing means operationally connected to the upper interface detection device and the lower interface detection device, to the first actuated valve and to the second actuated valve, the processing means configured to operate the first actuated valve and the second actuated valve such that the level of the interface between the oil phase and the water phase is maintained between the first elevation and the second elevation.

2. The apparatus according to claim 1, wherein the second vertical fluid separator pipe further comprises a vertical partition plate disposed therein so as to prevent fluid flowing into the second vertical fluid separator pipe via the second inlet from flowing directly into the oil outlet line.

3. The apparatus according to claim 1, wherein the inlet member connected to the first vertical fluid separator pipe is oriented so as to allow fluid entering the first vertical fluid separator pipe therethrough to enter the first vertical fluid separator pipe at a downward angle to create a cyclonic flow pattern within the first vertical fluid separator pipe.

* * * * *